(12) United States Patent
Widdowson et al.

(10) Patent No.: US 8,324,848 B2
(45) Date of Patent: Dec. 4, 2012

(54) SYSTEM FOR MAINTAINING THERMAL STABILITY OF A MOTION STAGE

(75) Inventors: Gary Peter Widdowson, Hong Kong (CN); Wai Chuen Gan, Hong Kong (CN); Cheuk Wah Tang, Hong Kong (CN); Chor Fai Wong, Hong Kong (CN)

(73) Assignee: ASM Assembly Automation Ltd, Hong Kong (HK)

( * ) Notice: Subject to any disclaimer, the term of this patent is extended or adjusted under 35 U.S.C. 154(b) by 775 days.

(21) Appl. No.: 12/366,275

(22) Filed: Feb. 5, 2009

(65) Prior Publication Data

US 2010/0194328 A1    Aug. 5, 2010

(51) Int. Cl.
*H02P 6/00* (2006.01)
*H02P 5/00* (2006.01)
*H02P 7/00* (2006.01)
*G05D 23/275* (2006.01)
*G01N 25/00* (2006.01)

(52) U.S. Cl. ............ 318/400.08; 318/38; 318/135; 318/632; 374/10

(58) Field of Classification Search .......... 318/38, 318/135, 400.08, 632; 374/10
See application file for complete search history.

(56) References Cited

U.S. PATENT DOCUMENTS

| | | | | |
|---|---|---|---|---|
| 6,744,228 B1* | 6/2004 | Cahill et al. | ........ | 318/135 |
| 6,949,844 B2* | 9/2005 | Cahill et al. | ........ | 310/12.02 |
| 7,312,848 B2* | 12/2007 | Tanaka et al. | ........ | 355/53 |
| 7,564,670 B2* | 7/2009 | Kozaki et al. | ........ | 361/139 |
| 7,830,109 B2* | 11/2010 | Sasaki et al. | ........ | 318/687 |
| 2003/0184252 A1* | 10/2003 | Takamune et al. | ........ | 318/632 |
| 2004/0140780 A1* | 7/2004 | Cahill et al. | ........ | 318/114 |
| 2005/0166726 A1* | 8/2005 | Montesanti et al. | ........ | 82/1.11 |
| 2005/0229737 A1* | 10/2005 | Tsuno et al. | ........ | 74/490.09 |
| 2007/0188117 A1* | 8/2007 | Shoda et al. | ........ | 318/135 |
| 2007/0278884 A1* | 12/2007 | Kozaki et al. | ........ | 310/90.5 |

* cited by examiner

*Primary Examiner* — Walter Benson
*Assistant Examiner* — Gabriel Agared
(74) *Attorney, Agent, or Firm* — Ostrolenk Faber LLP

(57) ABSTRACT

A system for maintaining thermal stability of a motion stage driven by a motor comprises a motion current generator operative to produce a motion current to drive the motion stage to move and a thermal current generator operative to produce a thermal current to dissipate heat in the motion stage for controlling a temperature of the motion stage without producing corresponding movement of the motion stage. A summation controller is operative to combine the motion current with the thermal current, and to produce a combined current output to the motor.

16 Claims, 3 Drawing Sheets

SYSTEM FOR MAINTAINING THERMAL STABILITY OF A MOTION STAGE

FIELD OF THE INVENTION

The invention relates to motion stages for positioning objects, and in particular to the maintenance of thermal stability of motion stages driven by motors.

BACKGROUND AND PRIOR ART

Multi-phase linear electromagnetic motors are generally made up of a row of permanent magnets. Induction coils or phase coils are arranged facing the magnets and in directions that are transverse to the flux generated by the magnets. A typical multi-phase linear motor for driving a motion stage may have two or three coils arranged longitudinally, in such a way as to be arranged in line in the direction of the motion stage. Hence, the coils are arranged parallel to the motion direction. In a two-phase motor where there are two sets of phase coils, the two phase currents are mutually offset by 90°. In a three-phase motor, the three phase currents are mutually offset by 120°.

A multi-phase linear motor may drive motion along a chosen motion axis. Heat is generated during operation of the linear motor when a driving current passes through it, which raises the temperature of the motion stage. On the other hand, when there is no motion, the temperature of the motion stage drops since the large driving current of the motor is absent. The variance in the temperature of the motion stage is undesirable in high precision applications. It is essential to maintain thermal stability of the motion stage for such applications to attain high positioning accuracy. A number of techniques are used in the prior art to control and maintain the thermal stability of the motion stage. Some applications use materials with low coefficients of thermal expansion such as invar, so that the expansion of the material due to an increase in temperature is low. Elaborate thermal compensation circuits can also be used, which include heaters for keeping the linear motor in the motion axis at a constant temperature.

There are however disadvantages in using the aforesaid methods to regulate the temperature of the motion stage. Motion stages which use materials having low coefficients of thermal expansion such as invar are not only costly but make the motion stage heavy. Motion stages that use thermal heaters or cooling systems for compensation are complicated, compromise reliability of the motors and increase expenses even further. It is therefore desirable to devise a compact and low cost method for maintaining the thermal stability of motion stages.

SUMMARY OF THE INVENTION

It is thus an object of the invention to seek to provide a motor for which a temperature of a motion stage driven by the motor may be regulated at a substantially stable level during operation, in particular when high accuracy is essential.

According to a first aspect of the invention, there is provided a system for maintaining thermal stability of a motion stage driven by a motor, comprising: a motion current generator operative to produce a motion current to drive the motion stage to move; a thermal current generator operative to produce a thermal current to dissipate heat in the motion stage for controlling a temperature of the motion stage without producing corresponding movement of the motion stage; and a summation controller operative to combine the motion current with the thermal current, and to produce a combined current output to the motor.

According to a second aspect of the invention, there is provided a method for maintaining thermal stability of a motion stage driven by a motor, comprising the steps of: producing a motion current with a motion current generator; producing a thermal current with a thermal current generator; and combining the motion current with the thermal current with a summation controller to produce a combined current output to the motor to drive the motion stage to move; wherein the motion current is operative to produce a force/torque to drive the motor and the thermal current is operative to dissipate heat in the motion stage for controlling a temperature of the motion stage without producing corresponding movement of the motion stage.

It will be convenient to hereinafter describe the invention in greater detail by reference to the accompanying drawings, which illustrate one embodiment of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of one preferred embodiment of the invention when considered with the accompanying drawings, in which.

DETAILED DESCRIPTION OF THE DETAILED EMBODIMENT OF THE INVENTION

Figure 1:
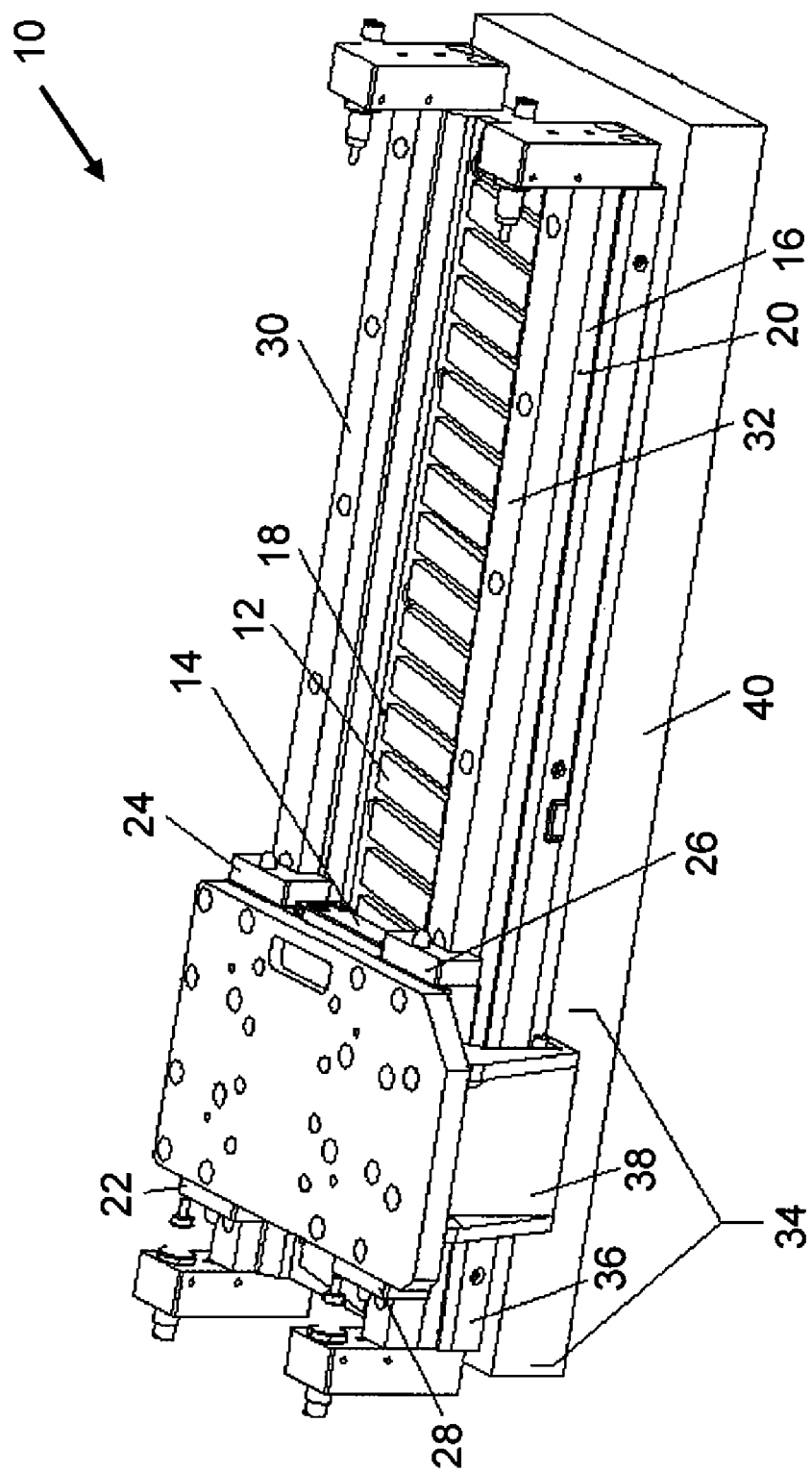
FIG. 1 is an isometric view of a motion stage incorporating a multi-phase linear motor according to the preferred embodiment of the invention.

FIG. 1 is an isometric view of a gantry or motion stage 10 incorporating a multi-phase linear motor, such as a two-phase or three-phase linear motor, according to the preferred embodiment of the invention. The motion stage 10 as illustrated comprises a linear motor including a stationary part 12 and a movable part 14.

The stationary part 12 of the linear motor is mounted on a base 16. The stationary part 12 consists primarily of a plurality of permanent magnets 18 and a highly permeable magnet iron 20. The movable part 14 of the linear motor is guided generally in one degree of freedom on guiding elements comprising a plurality of linear motion guide blocks 22, 24, 26, 28 such as steel balls which are secured to a pair of linear motion guide rails 30, 32. The linear motion guide rails 30, 32 are connected to the base 16. Alternatively, the guiding elements may comprise pressurized air bearings or magnetic bearings.

A linear encoder 34 mounted on the motion stage 10 comprises a stationary component 36 and a movable component 38. The stationary component 36 of the linear encoder 34 is mounted to the base 16 while the movable component 38 of the linear encoder 34 is mounted to the movable part 14 of the linear motor. The linear encoder 34, such as an optical encoder as illustrated, determines and records real-time feedback on the position of the motion stage 10. Alternatively, the linear encoder 34 may comprise a magnetic encoder or an inductive resolver. The base 16 is connected to a chassis of a machine by way of a support 40.

Figure 2:
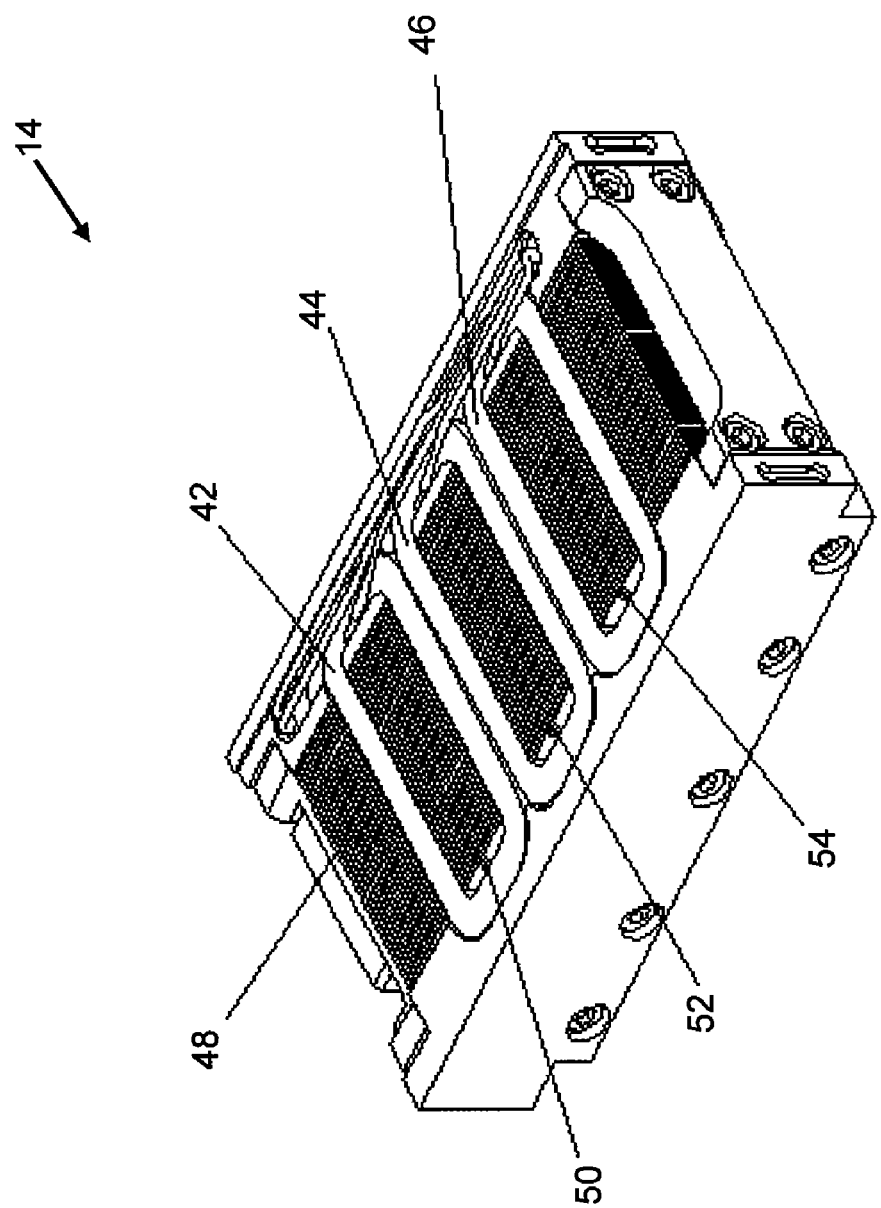
FIG. 2 is an isometric view of a movable part of the multi-phase linear motor according to the preferred embodiment of the invention.

FIG. 2 is an isometric view of the movable part 14 of the multi-phase linear motor according to the preferred embodiment of the invention. The linear motor shown is a three-phase motor and hence may comprise three electrical conductive coils 42, 44, 46 carrying current, the coils being supported on a block of highly permeable magnetic iron or iron alloy 48 by mounting them onto the surface of the permeable material using epoxy. Alternatively, the coils may be mounted on a non-magnetic material using epoxy. At least one temperature sensor such as a thermocouple may be used for maintaining thermal stability of the linear motor. In FIG. 2, a plurality of thermocouples 50, 52, 54 are employed and are located on the motion stage 10 adjacent to the electrical conductive coils 42, 44, 46 on the movable part 14 of the linear motor. There is no limit to the number of thermocouples which could be used for measuring the temperature of the linear motor. Thus, additional thermocouples can also be mounted on the motion stage 10 adjacent to the permanent magnets 18 on the stationary part 12 of the motor and/or on the base 16, such as a stationary thermocouple 20 illustrated in FIG. 1. In an alternative embodiment, the multi-phase linear motor may comprise a relatively movable plurality of permanent magnets 18 and highly permeable magnet iron 20, and relatively stationary electrical conductive coils 42, 44, 46 instead.

Figure 3:
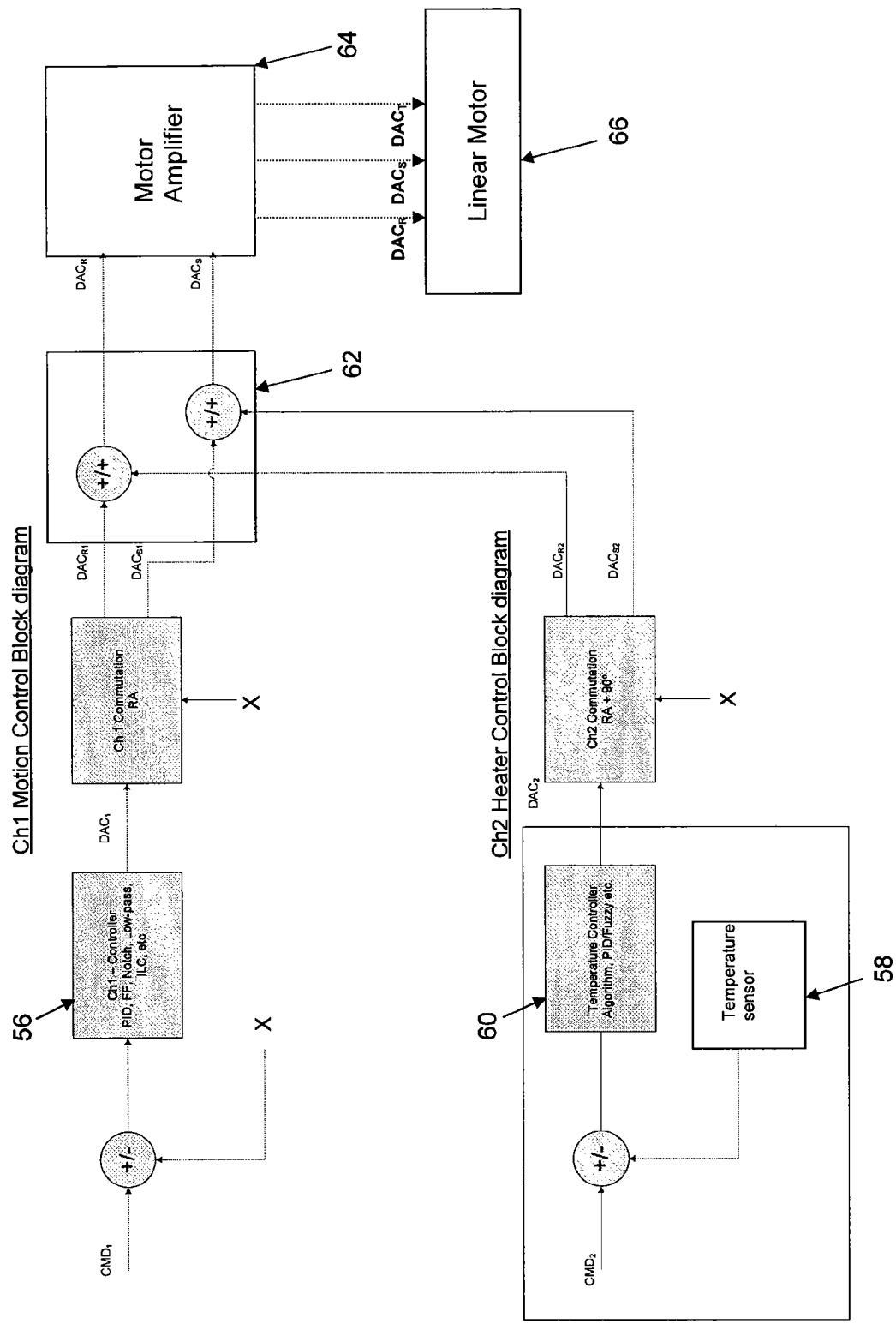
FIG. 3 is a block diagram illustrating a motion and temperature control system for maintaining thermal stability of the motion stage incorporating the multi-phase linear motor.

FIG. 3 is a block diagram illustrating a motion and temperature control system for maintaining thermal stability of the motion stage 10 incorporating the multi-phase linear motor. The control system maintains the temperature at the point(s) of measurement so that the linear motor and motion stage 10 are maintained at a stable temperature.

A motion current command $CMD_1$ from a motion current generator, as moderated by a positional feedback signal X from the linear encoder 34 regarding a position of the motion stage 10, is transmitted to a motion controller 56 connected to the linear encoder 34. The motion controller 56 is connected to the motion current generator for producing a motion current to drive the motion stage 10 to move. The motion controller 56 may comprise a Proportional Integral Derivative (PID), Feed Forward (FF), Notch filter, lower-pass filter, iterative learning control (ILC) controller and/or other control algorithms as required for accurate positioning of the linear motor. The motion controller 56 modifies the motion current to generate a digital-to-analogue current $DAC_1$ at a commutation rotor angle which produces maximum force/torque output to the linear motor. The commutation rotor angle can be calculated from the position of the motion stage 10 as determined from the linear encoder 34, to drive the movable part 14 of the linear motor to move. Two separate motion current control outputs, comprising first and second motion currents $DAC_{R1}$, $DAC_{S1}$, are then produced.

A thermal current command $CMD_2$ from a thermal current generator, as moderated by readings from a temperature sensor 58, is separately transmitted to a temperature controller 60. The temperature sensor 58, which comprises the thermocouples 50, 52, 54 in the described embodiment, is connected to the temperature controller 60. The temperature sensor 58 determines a temperature of the motion stage 10 and provides temperature feedback regarding the motion stage 10 to the temperature controller 60.

The moderated signal is conveyed to the temperature controller 60 which then produces a digital-to-analogue current $DAC_2$, which is a thermal current to dissipate heat in the motion stage 10 for controlling a temperature of the motion stage 10 without producing corresponding movement thereof. The temperature controller 60 modifies the thermal current to be out of phase with the commutation rotor angle by 90° so as not to produce a motion force/torque to the motor. Thus, the temperature controller 60 controls a magnitude of the thermal current suitable for maintaining thermal stability of the motion stage 10.

Two separate thermal current control outputs, comprising first and second thermal currents $DAC_{R2}$, $DAC_{S2}$, are produced corresponding to the first and second motion currents $DAC_{R1}$, $DAC_{S1}$, and the thermal currents $DAC_{R2}$, $DAC_{S2}$ are separated at an electrical angle of 90° with respect to the motion currents $DAC_{R1}$, $DAC_{S1}$. There is a sine relationship between the electrical angle and the force produced, so that the maximum force is produced when the electrical angle is at, say 90°, 270°, etc. Since the first and second motion currents $DAC_{R1}$, $DAC_{S1}$ are at a commutation rotor angle which produces the maximum force/torque, the first and second thermal currents $DAC_{R2}$, $DAC_{S2}$, being at a 90° electrical separation from the motion currents (i.e. 180°, 360°, etc) would produce no force/torque. Therefore, the first and second thermal currents $DAC_{R2}$, $DAC_{S2}$ will only result in heat dissipation to increase the temperature of the motion stage 10, but will not drive motion of the motion stage 10.

The pairs of motion and thermal currents $DAC_{R1}$, $DAC_{R2}$ and $DAC_{S1}$, $DAC_{S2}$ respectively are received by a summation controller 62 for summation of the respective pairs of currents as shown in FIG. 3. The summation controller 62 separately combines the first motion current $DAC_{R1}$ with the first thermal current $DAC_{R2}$, and combines the second motion current $DAC_{S1}$ with the second thermal current $DAC_{S2}$ respectively. The two separate combined current outputs $DAC_R$ and $DAC_S$ that result are received and amplified by a motor amplifier 64. As the motor is a three-phase motor, a third current command $DAC_T$ should be computed by the motor amplifier 64 which is out of phase with the two separate combined current outputs, such that the summation of the third current output generated by the current command $DAC_T$ and the resultant combined current outputs $DAC_R$ and $DAC_S$ would be equal to zero. All three current outputs $DAC_R$, $DAC_S$ and $DAC_T$ are then sent to the linear motor 66 for driving the motion stage 10 to move. For a two-phase motor, the two separate combined current outputs $DAC_R$ and $DAC_S$ are only amplified by the motor amplifier 64 before being sent to the linear motor 66. There is no need for a third current output command to be computed for correction of phase currents in a two-phase motor.

In summary, motion control outputs $DAC_{R1}$, $DAC_{S1}$, are used to primarily produce a motion force for the motion stage 10 to move with low power dissipation, and the thermal control outputs $DAC_{R2}$ and $DAC_{S2}$ are used to produce high power dissipation for heating when the motion stage 10 is moving at lower speeds or is stationary.

The operation of the motion stage 10 is now described. After a short initial warm up period, the temperature of the linear motor is measured continuously with the thermocouples 50, 52, 54 and the thermal currents $DAC_{R2}$, $DAC_{S2}$ are adjusted to keep the linear motor at a constant temperature. When the motion stage 10 is operating intensely under a large motion current command $CMD_1$, the thermal current command $CMD_2$ may be lowered to keep the temperature of the motion stage 10 constant. When the motion stage 10 stops moving, the thermal current command $CMD_2$ may increase to keep the motion stage 10 at the desired constant temperature by dissipating heat. Thus, the magnitudes of the thermal currents $DAC_{R2}$, $DAC_{S2}$ are reduced when the motion stage 10 is driven to move as compared to the magnitude of the thermal currents $DAC_{R2}$, $DAC_{S2}$ when the motion stage 10 is stationary. The thermal current command $CMD_2$ does not produce any motion since it is electrically aligned with the magnetic field and therefore does not produce any force/torque. The linear encoder 34 provides the feedback X on the position of the motion stage 10 so as to determine the commutation rotor angle required to produce a maximum force or torque output at each position of the motion stage 10.

It would be appreciated that the preferred embodiment of the invention provides a control system for maintaining thermal stability in a multi-phase linear motor both when more heat is generated during motion of the linear motor, and when less heat is generated when the linear motor is not moving. Further, the design of the linear motor which has thermocouples mounted onto the movable and/or stationary parts according to the preferred embodiment of the present invention is relatively simple and cheap to implement, with a reduced number of components to achieve higher reliability of the system as compared to the prior art solutions described above. A more accurate motion stage can therefore be constructed due to less thermal variation encountered by the linear motor.

The invention described herein is susceptible to variations, modifications and/or additions other than those specifically described and it is to be understood that the invention includes all such variations, modifications and/or additions which fall within the spirit and scope of the above description.

The invention claimed is:

1. A system for maintaining thermal stability of a motion stage driven by a motor, the system comprising:
   a motion current generator operative to produce a motion current to drive the motion stage to move;
   a motion controller connected to the motion current generator that is operative to modify the motion current to a commutation rotor angle which produces maximum motion force/torque to the motor;
   a thermal current generator operative to produce a thermal current to provide heat in the motion stage so as to increase a temperature of the motion stage without producing corresponding movement of the motion stage;
   a summation controller operative to combine the motion current with the thermal current, and to produce a combined current output to the motor; and
   a temperature controller connected to the thermal current generator that is operative to modify the thermal current to be out of phase with the commutation rotor angle by 90° so as not to produce a motion force/torque to the motor.

2. The system of claim 1, further comprising a linear encoder connected to the motion controller, wherein the linear encoder is operative to determine a position of the motion stage and to provide positional feedback regarding the motion stage to the motion controller.

3. The system of claim 1, further comprising a temperature sensor connected to the temperature controller for determining a temperature of the motion stage and to provide temperature feedback regarding the motion stage to the temperature controller.

4. The system of claim 3, wherein the temperature sensor comprises thermocouples mounted on the motion stage adjacent to electrical conductive coils for carrying current comprised in the motor.

5. The system of claim 4, further comprising thermocouples mounted adjacent to permanent magnets comprised in the motor on the motion stage.

6. A method for maintaining thermal stability of a motion stage driven by a motor, the method comprising the steps of:
   producing a motion current with a motion current generator;
   producing a thermal current with a thermal current generator; and
   combining the motion current with the thermal current with a summation controller to produce a combined current output to the motor to drive the motion stage to move;
   wherein the motion current is operative to produce a force/torque to drive the motor and the thermal current is operative to provide heat in the motion stage so as to increase a temperature of the motion stage without producing corresponding movement of the motion stage;
   the step of modifying the motion current to a commutation rotor angle for producing maximum motion force/torque to the motor before combining it with the thermal current; and
   the step of modifying the thermal current to be out of phase with the commutation rotor angle by 90° so that the thermal current does not produce a motion force/torque to the motor.

7. A system for maintaining thermal stability of a motion stage driven by a motor, the system comprising:
   a motion current generator operative to produce a motion current to drive the motion stage to move;
   a thermal current generator operative to produce a thermal current to provide heat in the motion stage so as to increase a temperature of the motion stage without producing corresponding movement of the motion stage;
   a summation controller operative to combine the motion current with the thermal current, and to produce a combined current output to the motor; and
   wherein the motion current comprises first and second motion currents and the thermal current comprises first and second thermal currents, and further wherein the summation controller is operative separately to combine the first motion current with first thermal current, and to combine the second motion current and second thermal current respectively, and provides two separate combined current outputs to the motor.

8. The system of claim 7, further comprising a motor amplifier connected between the summation controller and the motor, and operative to amplify the two combined current outputs to be provided to the motor.

9. The system of claim 8, wherein the motor amplifier is further operative to compute and generate a third current output to be provided to the motor, the third current output being out of phase with the two separate combined current outputs.

10. The method of claim 6, wherein a magnitude of the thermal current is reduced when the motion stage is driven to move as compared to the magnitude of the thermal current when the motion stage is stationary.

11. The method of claim 6, further comprising the step of determining a position of the motion stage with a linear encoder and providing positional feedback regarding the motion stage so as to determine the commutation rotor angle at the said position.

12. The method of claim 6, further comprising determining a temperature of the motion stage with a temperature sensor and providing temperature feedback so as to control a magnitude of the thermal current suitable for maintaining thermal stability of the motion stage.

13. The method of claim 12, wherein the temperature sensor comprises thermocouples mounted on the motion stage adjacent to electrical conductive coils carrying current comprised in the motor.

14. A method for maintaining thermal stability of a motion stage driven by a motor, the method comprising the steps of:

producing a motion current with a motion current generator;

producing a thermal current with a thermal current generator; and combining the motion current with the thermal current with a summation controller to produce a combined current output to the motor to drive the motion stage to move;

wherein the motion current is operative to produce a force/torque to drive the motor and the thermal current is operative to provide heat in the motion stage so as to increase a temperature of the motion stage without producing corresponding movement of the motion stage; and wherein the step of producing the motion current comprises producing first and second motion currents and the step of producing the thermal current comprises producing first and second thermal currents, wherein the first motion current is combined with the first thermal current, and the second motion current is combined with the second thermal current respectively by the summation controller to produce two separate combined current outputs, and the two separate combined current outputs are provided to the motor to drive the motion stage to move.

15. The method of claim 14, further comprising the step of amplifying the two separate combined current outputs produced by the summation controller with a motor amplifier to produce two amplified current outputs, and providing the two amplified current outputs to the motor to drive the motion stage to move.

16. The method of claim 15, further comprising the step of computing and generating a third current output with the motor amplifier and providing the third current output to the motor, wherein the third current output is out of phase with the first and second current outputs.

* * * * *